C. F. BURGESS.
BATTERY HAND LAMP.
APPLICATION FILED MAY 21, 1917. RENEWED DEC. 5, 1918.
1,297,656.
Patented Mar. 18, 1919.
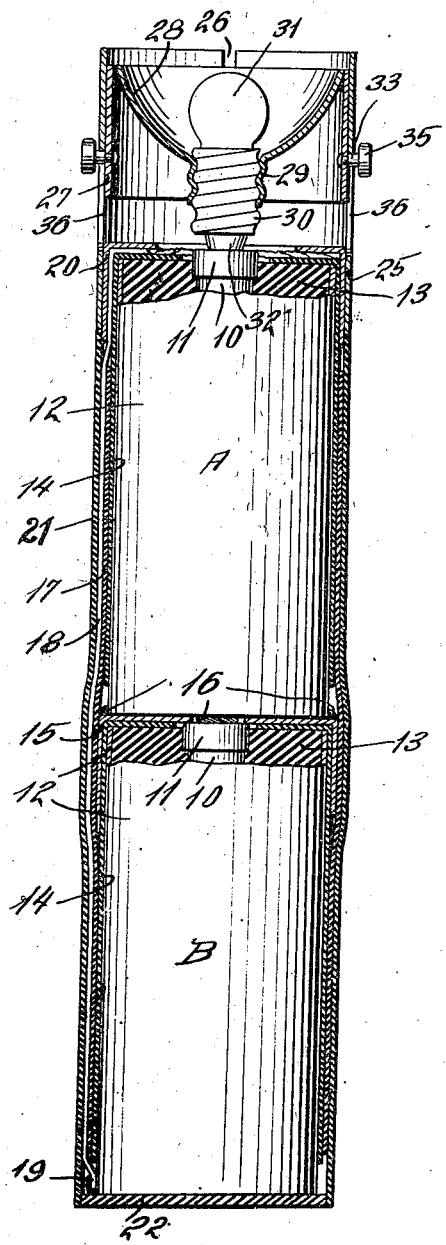
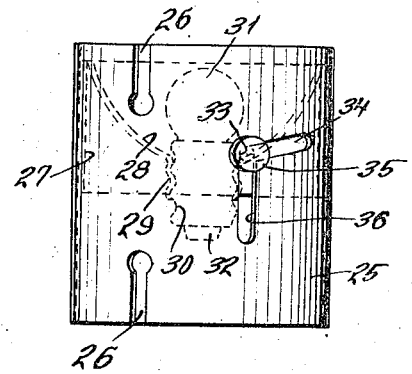
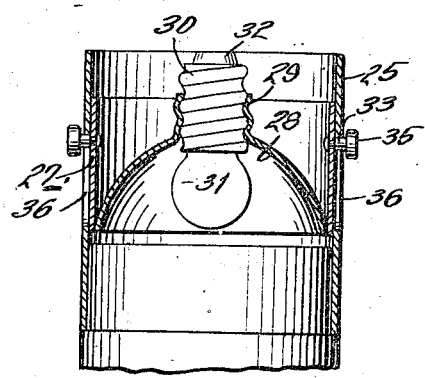
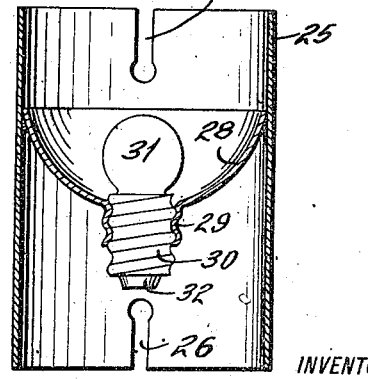
INVENTOR
Charlie F. Burgess
BY
Pennie Davis Marvin Edmonds
ATTORNEYS

UNITED STATES PATENT OFFICE.

CHARLES F. BURGESS, OF MADISON, WISCONSIN, ASSIGNOR TO BURGESS BATTERY COMPANY, A CORPORATION OF WISCONSIN.

BATTERY HAND-LAMP.

1,297,656. Specification of Letters Patent. Patented Mar. 18, 1919.

Application filed May 21, 1917, Serial No. 169,871. Renewed December 5, 1918. Serial No. 265,454.

*To all whom it may concern:*

Be it known that I, CHARLES F. BURGESS, a citizen of the United States, residing at Madison, in the county of Dane, State of Wisconsin, have invented certain new and useful Improvements in Battery Hand-Lamps; and I do hereby declare the following to be a full, clear, and exact description of the invention, such as will enable others skilled in the art to which it appertains to make and use the same.

The present invention relates to battery hand lamps of a type in which the battery is composed of a plurality of dry cells permanently connected together to form a unitary, rigid structure, which is serviceable as the body or handle of the device, and to one end of which a lamp may be detachably connected. In hand lamps of the present invention, the battery or body portion may be discarded when the cells of the battery become exhausted and a new battery substituted. The initial cost of the complete equipment is low, and as compared with many hand lamps now in use, there is a very considerable reduction in weight through elimination of the heavy fiber or metal casing in which the batteries of such devices are housed.

The present invention provides a support for the lamp which may be easily reversed in position upon the end of the battery of special construction to protect the lamp from injury and to avoid the danger of depleting the battery by accidental lighting of the lamp. The construction of the support also is convenient to manipulate, is easy to build, is inexpensive, and is possessed of many obvious advantages, particularly when used in conjunction with the special battery herein described. Certain preferred embodiments of the invention are illustrated in the accompanying drawing, in which—

Figure 1 is a view principally in section of a battery composed of two dry cells and having a lamp support attached to one end;

Fig. 2 is a view in elevation of the lamp support of Fig. 1;

Fig. 3 is a view principally in section showing the lamp support of Fig. 1 attached to the end of the battery in inverted position; and Fig. 4 is a view of a modified form of a reversible support.

Referring to the drawing, in which similar reference characters denote similar parts throughout the several views, the battery shown in Fig. 1 is composed of two dry cells A and B. Each of the cells has a carbon electrode 10 tipped with a metallic cap 11 which forms one terminal thereof. The other electrode of each cell is in the form of a zinc cup 12 which also serves as a container for the electrolytic paste and the depolarizing material which constitute parts of each cell. The paste and material are retained within the cell by the pitch seal 13. The foregoing details may be varied in many ways. A wrapping of impregnated paper or other suitable material 14, preferably waterproofed, surrounds the zinc cup except for a small portion near the bottom thereof. This wrapping is turned over the top of the cell and extends inwardly toward the metallic cap 11. Each of the cells of the battery, except the first one A, has fitted tightly upon its upper end a metallic cap 15 which extends inwardly far enough to engage the upper face of terminal 11 to which it preferably is soldered. When the cells are placed together as shown in Fig. 1, the zinc cup of one cell rests upon the cap 15 of an adjacent cell, but in order to make a better electrical contact and to attach the cells rigidly together, solder may be applied at a number of places as indicated at 16. The entire number of cells thus rigidly connected together in series connection and constituting the battery are wrapped with a covering 17 of paper or other suitable insulating material. The paper may be waterproofed. A conducting strip 18 is attached at its lower end 19, to the exposed zinc cup of the second cell B. The conducting strip extends to the other end of the battery where it is firmly held beneath and makes electrical connection with a terminal cap 20 forced tightly over the outer end of the cell A and provided with an aperture through which access may be obtained to the terminal 11. To protect the conducting strip 18, the entire battery, except for the cap 20, is covered with a wrapping 21 of paper, cloth or other suitable material, and if desired this wrapping may be waterproofed before or after its application, as with China wood oil, or with paraffin or the like. The bottom of the battery may be covered by a disk or cap 22 also of insulating material, or the side wrapping may be folded in over the bottom of the lowermost cell.

With the construction above described, the two terminals of the battery are adjacent to one another in convenient relation for ready attachment to a current-consuming device. In the present case the lamp support comprises a sleeve or casing 25 both ends of which are provided with slots 26 so that when the casing is slipped over the end of the battery it may be firmly retained in place by the spring action of the material between the slots. Within the casing 25 is mounted an annular member 27 to the upper end of which is attached a concave reflector 28 provided at its inner end with a screw-threaded socket 29 adapted to receive the base 30 of the lamp 31, the inner terminal 32 of which is adapted to engage the terminal 11 of the battery. The lamp support just described is retained in place within the sleeve 25 by means of studs 33 which extend through inclined slots 34 in the sides of the sleeve and which are provided with enlarged heads 35 by which the support may conveniently be moved.

The device of the present invention is arranged so that it may be reversed in order that the lamp may be placed on the end of the battery in the position shown in Fig. 3 where it is protected from injury. In order to attain this result, the lamp is arranged to slide longitudinally within the sleeve 25 for a considerable distance in order to provide sufficient space at the opposite end of the sleeve for attachment to the end of the battery in inverted position. This result is obtained by cutting longitudinal slots 36 in the side of the casing so that the support 27 may be slipped through the casing from one end toward the other.

When the device is in the position shown in Fig. 1, a partial rotation of the lamp support by means of a twisting pressure on the buttons 35 will, by virtue of the inclined portions of the slots, cause the inner terminal 32 of the lamp to be brought into or out of contact with the inner terminal of the battery. Since the casing 25 is in electrical contact with the other terminal of the battery, circuit will be made or broken through the lamp according as the pins 34 lie at the inner or outer ends of the inclined slots. When the lamp is thus in position for lighting, the support therefor lies near the outer end of the sleeve 25 so that no portion of the latter tends to cut off the light from the lamp.

If it be desired to carry the device with the lamp in protected position, the casing is detached from the battery, the lamps support is slipped to the other end of the casing, and the sleeve 25 is attached to the end of the battery in reversed position, as shown in Fig. 3. The bulb of the lamp is then out of contact with the end of the battery and its inner terminal does not extend beyond the exposed end of the sleeve 25 so that the lamp is properly protected and since there is no metallic member which may come in contact with the inner terminal 11 of the battery there is no danger of short-circuiting the latter.

In Fig. 4 is shown a modified embodiment of the invention in which the casing 25 is of such a length that the lamp may be permanently fixed at the center portions of this casing. The casing may be applied to the end of the battery in such a position that the inner terminal 32 of the lamp comes in contact with the inner terminal of the battery or the casing may be applied in reversed position with sufficient clearance between the end of the battery and the bulb of the lamp to prevent any danger of breaking the latter.

It will be understood that various changes in the details of construction of the device may be made without departing from the principle of the invention.

I claim :—

1. A battery hand lamp comprising, in combination, a battery having a central terminal of one polarity and an outer terminal of opposite polarity, a casing adapted to be detachably secured to said battery in contact with said outer terminal, a lamp and a support therefor mounted within said casing and adapted when said casing occupies one position to cause one terminal of the lamp to engage the said central terminal of the battery and when the casing occupies a reversed position on the end of the battery to cause the lamp to be inverted and out of contact with the end of the battery.

2. A battery hand lamp, comprising, in combination, a battery composed of a plurality of dry cells electrically connected in series and having a central terminal of one polarity and an adjacent terminal of opposite polarity, a casing adapted to be fitted over said adjacent terminal in either of two positions, a support movably mounted within the casing, a lamp on said support, and means whereby said support may be held in one position within the casing when the lamp is to be lit and in another position within the casing to permit the casing to be attached to the end of the battery in reversed relation.

3. A battery hand lamp comprising, in combination, a battery having a central terminal and an outer terminal, a casing adapted to be detachably secured at either end to the battery in contact with said outer terminal, an annular member within said casing, a reflector attached to said annular member, a lamp mounted in said reflector, studs attached to said annular member and extending through slots in said casing said slots having inclined portions adapted to cause movement of said annular member to and from the end of said battery when the studs are moved therein and also provided with portions extending longitudinally of said casing to permit said annular member to be moved within said casing to allow the casing to be inserted upon the end of the battery in reversed position.

4. A battery hand lamp comprising, in combination, a battery, a casing associated with the battery, a reflector mounted within the casing and movable with respect thereto, and a lamp supported on the reflector whereby its circuit may be controlled by movement of the reflector.

5. A battery hand lamp comprising, in combination, a battery having a central terminal, a casing associated with the battery, a reflector mounted within the casing and movable with respect thereto, and a lamp supported on the reflector whereby one of its terminals may be moved into or out of contact with the central terminal of the battery.

6. A battery hand lamp comprising, in combination a battery, a casing adapted to be detachably secured to one end of the battery, a reflector movably mounted within and with respect to the casing and a lamp supported on the reflector whereby its circuit may be controlled by movement of the reflector.

7. A battery hand lamp comprising, in combination, a battery having a central terminal of one polarity and an outer terminal of opposite polarity, a casing adapted to be detachably secured to said battery in contact with the outer terminal, a reflector movably mounted within said casing, and a lamp supported on the reflector whereby it may be moved into or out of contact with said central terminal.

8. A battery hand lamp comprising, in combination, a battery having a central terminal of one polarity and an outer terminal of opposite polarity, a casing adapted to be detachably secured to said battery in contact with the outer terminal, a reflector movably mounted within said casing, a socket attached to the reflector, a lamp mounted in the socket, and means for moving said reflector whereby said lamp may be moved into or out of contact with said central terminal.

9. A battery hand lamp comprising, in combination a battery composed of a plurality of cells electrically connected in series and having at one end a central terminal and an outer terminal, a casing adapted to be detachably secured to said battery in contact with the outer terminal, a reflector movably mounted within said casing, and a lamp supported on the reflector whereby it may be moved into or out of contact with said central terminal.

10. A battery hand lamp comprising, in combination, a battery composed of a plurality of cells rigidly and electrically connected in series relation and having at one end a central terminal and an outer terminal, a casing adapted to be detachably secured to said battery in contact with the outer terminal, a reflector movably mounted within said casing, and a lamp supported on the reflector whereby it may be moved into or out of contact with said central terminal.

11. A battery hand lamp comprising, in combination a battery composed of a plurality of cells connected end on end and each having a central terminal and an outer terminal, a collar encircling the free end of the topmost cell and insulated therefrom, an insulated conductor connecting the collar and the outer terminal of the lowermost cell, a casing adapted to be detachably secured to the topmost cell in contact with the collar, a reflector movably mounted within the casing, and a lamp supported on the reflector whereby it may be moved into or out of contact with the central terminal of the topmost cell.

In testimony whereof I affix my signature.

CHARLES F. BURGESS.